United States Patent
Choi et al.

(10) Patent No.: US 11,733,444 B2
(45) Date of Patent: Aug. 22, 2023

(54) METHOD FOR MANUFACTURING POLARIZING PLATE AND ADHESIVE COMPOSITION FOR POLARIZING PLATE

(71) Applicant: Shanjin Optoelectronics (Suzhou) Co., Ltd., Jiangsu (CN)

(72) Inventors: Su Youn Choi, Daejeon (KR); Jin Woo Kim, Daejeon (KR); Yoonkyung Kwon, Daejeon (KR); Dong Uk Kim, Daejeon (KR)

(73) Assignee: Shanjin Optoelectronics (Suzhou) Co., Ltd.

( * ) Notice: Subject to any disclaimer, the term of this patent is extended or adjusted under 35 U.S.C. 154(b) by 193 days.

(21) Appl. No.: 16/959,028

(22) PCT Filed: Jan. 23, 2020

(86) PCT No.: PCT/KR2020/001205
§ 371 (c)(1),
(2) Date: Jun. 29, 2020

(87) PCT Pub. No.: WO2020/153803
PCT Pub. Date: Jul. 30, 2020

(65) Prior Publication Data
US 2021/0191020 A1    Jun. 24, 2021

(30) Foreign Application Priority Data
Jan. 25, 2019    (KR) .................. 10-2019-0009943

(51) Int. Cl.
*B32B 37/12*    (2006.01)
*G02B 5/30*    (2006.01)
(Continued)

(52) U.S. Cl.
CPC ............ *G02B 5/3025* (2013.01); *B32B 23/08* (2013.01); *B32B 27/08* (2013.01); *B32B 37/12* (2013.01); *C08K 5/45* (2013.01); *C09J 5/00* (2013.01); *C09J 11/06* (2013.01); *C09J 137/00* (2013.01); *C09J 163/00* (2013.01); *G02F 1/133528* (2013.01); *B32B 2305/72* (2013.01); *B32B 2310/0837* (2013.01);
(Continued)

(58) Field of Classification Search
CPC ...... C09J 5/00; C09J 163/00; C09J 2301/416; B32B 37/12
See application file for complete search history.

(56) References Cited

U.S. PATENT DOCUMENTS

2012/0320314 A1    12/2012    Lin et al.
2014/0302328 A1    10/2014    Cho et al.
(Continued)

FOREIGN PATENT DOCUMENTS

| CN | 101636672 A | 1/2010 |
| CN | 104277720 A | 1/2015 |

(Continued)

OTHER PUBLICATIONS

Machine Translation of KR-2018082800-A (Year: 2018).*
(Continued)

*Primary Examiner* — Daniel McNally (57) ABSTRACT

The present specification relates to a method for manufacturing a polarizing plate, and an adhesive composition for a polarizing plate.

12 Claims, 2 Drawing Sheets

(51) Int. Cl.
- *B32B 23/08* (2006.01)
- *B32B 27/08* (2006.01)
- *C09J 11/06* (2006.01)
- *C09J 137/00* (2006.01)
- *C09J 163/00* (2006.01)
- *G02F 1/1335* (2006.01)
- *C08K 5/45* (2006.01)
- *C09J 5/00* (2006.01)

(52) U.S. Cl.
CPC ... *B32B 2310/0887* (2013.01); *B32B 2551/00* (2013.01); *C09J 2301/416* (2020.08); *C09J 2401/006* (2013.01); *C09J 2463/00* (2013.01)

(56) References Cited

U.S. PATENT DOCUMENTS

| | | | |
|---|---|---|---|
| 2014/0320960 A1* | 10/2014 | Saito | B32B 27/06 |
| | | | 156/275.7 |
| 2015/0017448 A1 | 1/2015 | Suwa et al. | |
| 2015/0152299 A1 | 6/2015 | Saito et al. | |

FOREIGN PATENT DOCUMENTS

| | | | | |
|---|---|---|---|---|
| CN | 104419331 | A | 3/2015 | |
| CN | 106662690 | A | 5/2017 | |
| CN | 108084893 | A | 5/2018 | |
| JP | 2008065160 | A | 3/2008 | |
| JP | 2010231015 | A | 10/2010 | |
| JP | 2012062471 | A | 3/2012 | |
| JP | 2014524596 | A | 9/2014 | |
| JP | 2014527647 | A | 10/2014 | |
| JP | 2014215560 | A | 11/2014 | |
| JP | 2014531047 | A | 11/2014 | |
| JP | 2015011094 | A | 1/2015 | |
| JP | 2015518574 | A | 7/2015 | |
| JP | 2015210497 | A | 11/2015 | |
| JP | 5825147 | B2 | 12/2015 | |
| JP | 2018200463 | A | 12/2018 | |
| KR | 20140119252 | A | 10/2014 | |
| KR | 20140128222 | A | 11/2014 | |
| KR | 20160095996 | A | 8/2016 | |
| KR | 20160117469 | A | 10/2016 | |
| KR | 20160095996 | A | 12/2016 | |
| KR | 20170023863 | A | 3/2017 | |
| KR | 2018082800 | A * | 7/2018 | .............. C09J 11/06 |
| KR | 20180082800 | A | 7/2018 | |
| TW | 201300885 | A | 1/2013 | |
| TW | 201406906 | A | 2/2014 | |
| TW | 201809755 | A | 3/2018 | |
| WO | 2014129260 | A1 | 8/2014 | |
| WO | 2014178239 | A1 | 11/2014 | |

OTHER PUBLICATIONS

Search Report for Taiwanese Application No. 109102792 dated Sep. 10, 2020; 1 page.

Search Report dated Dec. 20, 2021 from the Office Action for Chinese Application No. 202080001123.0 dated Dec. 28, 2021, 3 pgs.

Search report from International Application No. PCT/KR2020/001205, dated Apr. 29, 2020.

Decison of Rejection by Japan Patent Office, dated Aug. 1, 2022, whole translation.

* cited by examiner

METHOD FOR MANUFACTURING POLARIZING PLATE AND ADHESIVE COMPOSITION FOR POLARIZING PLATE

CROSS-REFRENCE TO RELATED APPLICATIONS

The present application is a national phase entry under 35 U.S.C. § 371 of International Application No. PCT/KR2020/001205 filed on Jan. 23, 2020, which claims priority from Korean Patent Application No. 10-2019-0009943, filed with the Korean Intellectual Property Office on Jan. 25, 2019, the entire contents of which are incorporated herein by reference.

Technical Field

The present specification relates to a method for manufacturing a polarizing plate, and an adhesive composition for a polarizing plate.

Background Art

Polarizing plates used in image display devices such as liquid crystal display devices generally use a triacetyl cellulose film (hereinafter, TAC film) as a protective film for protecting a polyvinyl alcohol polarizer currently. However, a TAC film does not have sufficient moisture and heat resistance, and, when used under high temperature or high humidity, has a problem that polarizing plate properties such as a degree of polarization or color decline due to film deformation. Accordingly, methods of using a transparent acryl-based resin film having excellent moisture and heat resistance as a material of a polarizer protective film instead of a TAC film have been proposed recently.

Herein, as an adhesive used for attaching the polarizer and the protective film, water-based adhesives formed with an aqueous solution of a polyvinyl alcohol-based resin have been normally used. However, the water-based adhesive has weak adhesive strength when using an acryl-based film or a COP film as a protective film instead of TAC, which causes a problem in that the use is limited depending on the film material. In addition, as well as a problem of poor adhesive strength depending on the material, the water-based adhesive causes problems such as curl occurrences due to a drying process of the water-based adhesive and initial optical property decline in a polarizing plate when using different protective film materials on both surfaces of a PVA element. Moreover, when using the water-based adhesive, a drying process is essential, and in such a drying process, differences in moisture permeability, thermal expansion and the like occur causing a problem of increasing a defect rate.

As an alternative to such problems, methods of using a non-water-based adhesive instead of a water-based adhesive have been proposed.

Accordingly, methods of enhancing reliability and yield of a polarizing plate using a cation polymerizable ultraviolet curable adhesive instead of a water-based adhesive have been proposed.

When irradiating energy rays on one surface of a laminate to cure an adhesive, the irradiated energy rays are absorbed by a polarizer reducing the amount of the energy rays reaching the adhesive composition provided on a surface opposite from the irradiated direction, and as a result, a difference occurs in the curing rate of the adhesive layer. This may cause curls in a polarizing plate.

In view of the above, by using a photoinitiator having high sensitivity to light in a long wavelength region, the present disclosure is to prevent curl occurrences in a polarizing plate by improving a curing rate of an adhesive provided on, as well as the light-irradiated surface side, the opposite side.

PRIOR ART DOCUMENT

Patent Document

Korean Patent Application Laid-Open Publication No. 2016-0095996

DISCLOSURE

Technical Problem

The present specification is directed to providing a method for manufacturing a polarizing plate, and an adhesive composition for a polarizing plate.

Technical Solution

One embodiment of the present specification provides a method for manufacturing a polarizing plate, the method comprising preparing a polarizer; providing an adhesive composition on one surface of each of a first protective film and a second protective film; laminating the first protective film on one surface of the polarizer, and laminating the second protective film on the other surface of the polarizer; and adhering the first protective film, the polarizer and the second protective film by curing the adhesive composition through irradiating active energy rays on the first protective film side, wherein the adhesive composition provided on one surface of the second protective film comprises a photoinitiator and a photosensitizer represented by the following Chemical Formula 1.

[Chemical Formula 1]

In Chemical Formula 1,

Ra and Rb are the same as or different from each other, and are hydrogen; deuterium; or a substituted or unsubstituted alkyl group, Rc is a substituted or unsubstituted alkyl group, m and n are each an integer of 0 to 4, o is an integer of 2 to 4, when m is 2 or greater, Ras are the same as or different from each other, when n is 2 or greater, Rbs are the same as or different from each other, when o is 2 or greater, Rcs are the same as or different from each other, and n+o≤4.

Another embodiment of the present specification provides an adhesive composition for a polarizing plate, the composition comprising a photoinitiator and the photosensitizer represented by Chemical Formula 1.

Advantageous Effects

A method for manufacturing a polarizing plate according to one embodiment of the present specification has an advantage of improving light efficiency by controlling an irradiation direction of active energy rays used for curing an adhesive layer and using an adhesive layer composition suitable for this purpose. Specifically, a curing rate of an adhesive layer provided on a surface opposite to a protective film irradiated with active energy rays can be improved.

The method for manufacturing a polarizing plate according to one embodiment of the present specification has advantages of enhancing curing efficiency even in a long wavelength curing system and minimizing a problem of curl occurrences in a polarizing plate when curing by having high curing reliability.

MODE FOR DISCLOSURE

Hereinafter, the present specification will be described in more detail.

In the present specification, a description of a certain part "comprising" certain constituents means capable of further comprising other constituents, and does not exclude other constituents unless particularly stated on the contrary.

In the present specification, "or" represents, unless defined otherwise, a case of selectively or all comprising those listed, that is, a meaning of "and/or".

In the present specification, a "layer" means covering 70% or more of an area where the corresponding layer is present. It means covering preferably 75% or more, and more preferably 80% or more.

In the present specification, a "thickness" of a certain layer means a shortest distance from a lower surface to an upper surface of the corresponding layer.

In the present specification, spatially relative terms "one surface" and "the other surface" may be used to readily describe a correlation between one constituent and other constituents as illustrated in the drawings. Spatially relative terms need to be understood as terms comprising different directions of constituents when used or operated in addition to the direction illustrated in the drawings. For example, when flipping a constituent illustrated in the drawing, a constituent described as "one surface" of another constituent may be placed on "the other surface" of another constituent. Accordingly, an exemplary term "one surface" may comprise both directions down and up. The constituent may be oriented in other directions as well, and accordingly, spatially relative terms may be interpreted depending on orientation.

In the present specification, a "photosensitizer" may mean a component improving curability of an adhesive for a polarizing plate. Specifically, a photosensitizer in the present specification is one type of a catalyst, and, when absorbing UV having a proper wavelength, is decomposed to produce radicals, and the radicals produced herein react with the photoinitiator to reach polymerization.

In the present specification, "absorption" means a certain material absorbing light, and "initiation" may mean a material absorbing light to produce radicals or cations and thereby to initiate polymerization with a monomer. For example, a short wavelength initiator of the present application may absorb a proper wavelength to initiate monomer polymerization.

When exposed to UV, a photosensitizer is excited to singlet or triplet, and a cation initiator is activated by electron transfer of the activated photosensitizer to start a curing reaction.

Herein, when irradiating light in a short wavelength UVB region, irradiating light in a long wavelength UVA region is required since there may be damages in a polarizing plate. In addition, since an optical film coated with a general liquid crystal material has reduced light transmittance in a short wavelength region, it is necessary to irradiate light on the optical film side not coated with a liquid crystal material and having excellent light transmittance. However, this may have a problem of insignificant curing of an adhesive layer on a protective film side provided on a surface opposite to the light irradiated side, and reactivity of the photosensitizer included in the adhesive layer on a protective film side provided on a surface opposite to the light irradiated side needs to be high in a long wavelength region.

In the present specification, the term "curing of composition" means a process in which the composition is changed so as to exhibit adhesive or gluing properties by a physical action or a chemical reaction of components of the composition. In addition, the term "active energy rays" in the present specification may mean a particle beam such as an α particle beam, a proton beam, a neutron beam and an electron beam as well as microwaves, infrared rays (IR), ultraviolet rays (UV), X-rays and γ-rays, and may commonly be ultraviolet rays, an electron beam or the like.

In addition, the "active energy ray-curable" may mean that such curing may be induced by irradiation of active energy rays. In one example of the present disclosure, curing of the active energy ray-curable composition may be conducted through a free radical polymerization or a cation reaction by irradiation of active energy rays, and preferably, the free radical polymerization and the cation reaction may be conducted together simultaneously or consecutively.

A polarizing plate is generally manufactured using a process of preparing a polarizing plate laminate laminated using an adhesive layer as a medium in advance, and then curing the adhesive layer through irradiating ultraviolet light on the polarizing plate laminate.

However, when the polarizing plate laminate comprises a base material having decreased transmittance to ultraviolet rays such as a liquid crystal material, the ultraviolet rays do not readily pass the base material and thereby may not reach an adhesive layer provided on the opposite surface. When the adhesive layer provided on the opposite surface is not sufficiently cured, curling may occur in each constitution of the laminate during a polarizing plate manufacturing process.

Increasing intensity of the ultraviolet rays in view of the above has a problem of inhibiting polarization properties of a polarizer included in the polarizing plate laminate.

On the other hand, when a light source irradiating active energy rays has a long wavelength, the active energy rays may favorably pass through a member provided between the light source and an adhesive layer, and has an advantage of favorably reaching the adhesive layer. Herein, sensitivity of the active energy rays reaching the adhesive layer, and the adhesive layer needs to be improved.

One embodiment of the present specification provides a method for manufacturing a polarizing plate, the method comprising preparing a polarizer; providing an adhesive composition on one surface of each of a first protective film and a second protective film; laminating the first protective film on one surface of the polarizer, and laminating the second protective film on the other surface of the polarizer; and adhering the first protective film, the polarizer and the second protective film by curing the adhesive composition through irradiating active energy rays on the first protective film side, wherein the adhesive composition provided on one surface of the second protective film comprises a photoinitiator and a photosensitizer represented by the following Chemical Formula 1.

[Chemical Formula 1]

In Chemical Formula 1,

Ra and Rb are the same as or different from each other, and are hydrogen; deuterium; or a substituted or unsubstituted alkyl group, Rc is a substituted or unsubstituted alkyl group, m and n are each an integer of 0 to 4, o is an integer of 2 to 4, when m is 2 or greater, Ras are the same as or different from each other, when n is 2 or greater, Rbs are the same as or different from each other, when o is 2 or greater, Rcs are the same as or different from each other, and $n+o \leq 4$.

Figure 1:
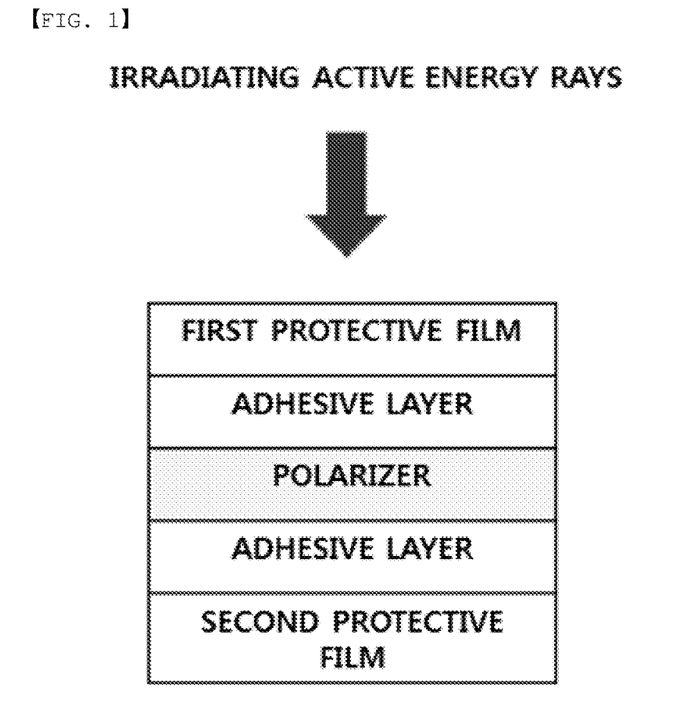
FIG. 1 illustrates a method for manufacturing a polarizing plate according to one embodiment of the present specification.

The process of manufacturing a polarizing plate having a structure in which a protective film is attached on both surfaces of a polarizer using an adhesive composition as above is progressed as illustrated in FIG. 1. In other words, one surface or both surfaces of a laminate having a structure in which a protective film is attached on both surfaces of a polarizer using an adhesive composition before curing are irradiated with active energy rays to cure the adhesive composition. In this case, curls may occur in the polarizing plate when curing rates of the adhesive layers each provided on both surfaces of the polarizer differ. Particularly, such a problem may be more pronounced when irradiating energy rays on just one surface of the laminate as in FIG. 1. In addition, since the irradiated energy rays are absorbed by the polarizer, the amount of the energy rays reaching the adhesive composition provided on the surface opposite from the irradiated direction decreases, which further deepens the problem of curl occurrences.

In addition, when curing of the adhesive layer is slow, there may be a problem of transferring pressing on the adhesive layer by foreign substances present in a roll when the polarizing plate moves through the roll. Therefore, a curing rate of the adhesive layer needs to be improved.

In view of the above, the adhesive layer provided on the surface opposite from the irradiated direction of light may be cured by irradiating light in a long wavelength region that may favorably transmit the polarizer and, since an adhesive composition generally has low sensitivity to light in a long wavelength region, there may be a problem of low curing rate of the adhesive layer.

However, the method for manufacturing a polarizing plate according to one embodiment of the present specification has improved the above-described problems by the adhesive composition provided on one surface of the second protective film comprising a photoinitiator and the photosensitizer represented by Chemical Formula 1. In this case, sensitivity of the adhesive composition to light in a long wavelength region may be improved, which controls a curing rate of the adhesive composition provided on both surfaces of the polarizer, and the problem of curl occurrences in the polarizing plate described above may be resolved.

In the present specification, the "first protective film" is a protective film on an active energy ray-irradiated side, and the "second protective film" is a protective film on a side opposite to the active energy ray-irradiated side.

In one embodiment of the present specification, the providing of an adhesive composition on one surface of each of the first protective film and the second protective film may be providing an adhesive composition each of between the first protective film and the polarizer; and between the second protective film and the polarizer.

In one embodiment of the present specification, the method of providing an adhesive composition on one surface of each of the first protective film and the second protective film is not particularly limited, and various methods such as directly dropping the adhesive composition, a roll coat method, a spray method and a dipping method may be employed. When coating, it may be coated on any one of the protective film and the polarizer, or on both. The coating is preferably conducted so that the thickness of the adhesive layer is greater than 0 μm and less than or equal to 20 μm after drying. The thickness of the adhesive layer is more preferably greater than or equal to 500 nm and less than or equal to 3 μm in terms of obtaining a uniform in-surface thickness and obtaining sufficient adhesive strength. The thickness of the adhesive layer may be adjusted by a solid concentration in the solution of the adhesive or by a coating device of the adhesive. In addition, the thickness of the adhesive layer may be identified by observing the cross section using a scanning electron microscope (SEM).

In one embodiment of the present specification, the active energy rays may be generated through a high pressure mercury lamp, a metal halide lamp, an LED lamp or the like. For example, a V-bulb may be used, and the V-bulb has a size of 10 inches, and may have intensity of 300 W/inch or 375 W/inch.

In one embodiment of the present specification, the active energy rays may be light with a long wavelength. Herein, the active energy rays may have a maximum wavelength range of 380 nm to 420 nm, 390 nm to 420 nm, or 390 nm to 410 nm. When the wavelength is in the above-mentioned range, the active energy rays may pass through the polarizer and favorably reach the adhesive layer provided on the opposite surface. The maximum wavelength range means a wavelength band having the highest intensity in the intensity graph for each wavelength band of the active energy rays.

In one embodiment of the present specification, light transmittance of the first protective film for the active energy rays may be higher compared to light transmittance of the second protective film for the active energy rays. In other words, by controlling the protective film on the side irradiated with active energy rays to have high transmission and the protective film on the side not irradiated with active energy rays to have low transmission, curing of the adhesive composition provided on both surfaces of the polarizer may uniformly occur.

In one embodiment of the present specification, the first protective film may have transmission of 70% or greater, preferably 75% or greater, and more preferably 80% or greater at a wavelength of 400 nm.

In one embodiment of the present specification, the second protective film may have transmission of 30% or less, preferably 28% or less, and more preferably 25% or less at a wavelength of 400 nm.

In one embodiment of the present specification, the protective film is for supporting or protecting the polarizer, and protective films of various materials generally known in the art such as a polyethylene terephthalate (PET) film, a cycloolefin polymer (COP) film, an acryl-based film and the like may be used. When considering optical properties, durability, economic feasibility and the like, using a polyethylene terephthalate or triacetyl cellulose-based film is particularly preferred among these.

In one embodiment of the present specification, the first protective film or the second protective film may be a triacetyl cellulose-based film.

In one embodiment of the present specification, the second protective film may be a retardation film.

In one embodiment of the present specification, the second protective film and the first protective film may have a thickness ratio of 1:3 to 3:1, preferably 1:1 to 3:1, and more preferably 2:1 to 3:1.

In one embodiment of the present specification, the polarizer may have transmission of 30% or greater, preferably 33% or greater, and more preferably 36% or greater at a wavelength of 400 nm. The light irradiated on the first protective film passes through the first protective film and reach the polarizer. Herein, the light reaching the polarizer also needs to favorably transmit to favorably reach the adhesive composition provided on the second protective film side. Accordingly, the polarizer having transmission in the above-mentioned range has an advantage in that light favorably reaches the second protective film, and the adhesive on the second protective film side is favorably cured.

In one embodiment of the present specification, the adhering of the first protective film, the polarizer and the second protective film further comprises irradiating active energy rays on the second protective film side after irradiating active energy rays on the first protective film side. This may cure the adhesive that may remain on the second protective film side without being cured.

In the present specification, the "photosensitizer" has proper sensitivity to the wavelength of the used active energy rays and performs a role of increasing a photoinitiation reaction rate of a photoinitiator by transferring energy to the photoinitiator through a faster photoinitiation reaction than the photoinitiator.

In one embodiment of the present specification, the photosensitizer may be represented by Chemical Formula 1. The photosensitizer represented by Chemical Formula 1 comprises two or more alkyl groups represented by Rc, which has an advantage of increasing light curing efficiency through a red shift of an absorption wavelength band compared when comprising one alkyl group.

In one embodiment of the present specification, Chemical Formula 1 may be represented by the following Chemical Formula 2.

[Chemical Formula 2]

In Chemical Formula 2, Ra to Rc, m and n have the same definitions as in Chemical Formula 1. In this case, Nos. 2 and 4 positions of the benzene ring in the thioxanthone structure are substituted with an alkyl group represented by Rb, and the alkyl group functions as an electron donor and is advantageous for long wavelength absorption through a red shift.

In one embodiment of the present specification, the photosensitizer may be 2,4-diethylthioxanthone (product name: DETX, Lambson Ltd.).

In one embodiment of the present specification, the photosensitizer may have a main absorption wavelength band of 360 nm to 420 nm, preferably 370 nm to 410 nm, more preferably 380 nm to 400 nm, and particularly 368 nm. When satisfying the above-mentioned numerical range, the photosensitizer may have increased reactivity, and the curing rate may be maintained equally even when applying the adhesive composition on both surfaces of the polarizer at the same time. In addition, the adhesive may be sufficiently cured even in a long wavelength region, and therefore, a phenomenon of the adhesive being not sufficiently cured and pressed by foreign substances on a surface of a roll used during the polarizing plate manufacturing process, that is, a "pressing phenomenon", may be suppressed. Accordingly, the adhesive layer may be cured just by irradiating light in a long wavelength region, and problems such as damages on the polarizer that may occur by irradiation of light in an ultraviolet region may be effectively resolved. In addition, there is an advantage of having an excellent curing rate by having excellent sensitivity to a long wavelength region.

In one embodiment of the present specification, the content of the photosensitizer may be 5% by weight or less, preferably 1% by weight or less, and more preferably 0.7% by weight or less based on the total weight of the adhesive composition. When satisfying the above-mentioned numerical range, the curing rate of the composition is maintained excellent, and by preventing the adhesive layer from being excessively cured, cracks on the adhesive layer may be prevented.

In one embodiment of the present specification, the adhesive composition may comprise the photosensitizer and the photoinitiator in a content ratio of 1:1 to 1:10, preferably 1:2 to 1:9, and more preferably 1:3 to 1:8. When satisfying the above-mentioned numerical range, a phenomenon of increasing a photoinitiation reaction rate of the photoinitiator may effectively occur by transferring energy to the photoinitiator.

In one embodiment of the present specification, the adhesive composition provided on the second protective film side comprises a photoinitiator and the photosensitizer represented by Chemical Formula 1.

In one embodiment of the present specification, Rc is a substituted or unsubstituted alkyl group having 1 to 30 carbon atoms.

In one embodiment of the present specification, Rc is a substituted or unsubstituted alkyl group having 1 to 10 carbon atoms.

In one embodiment of the present specification, Rc is a substituted or unsubstituted methyl group, a substituted or unsubstituted ethyl group, a substituted or unsubstituted propyl group, or a substituted or unsubstituted butyl group.

In one embodiment of the present specification, Rc is a substituted or unsubstituted ethyl group.

In one embodiment of the present specification, Rc is an ethyl group.

In one embodiment of the present specification, the adhesive composition provided on one surface of the first protective film may be the same as or different from the adhesive composition provided on one surface of the second protective film.

The adhesive composition provided on one surface of the first protective film may comprise a photoinitiator and a photosensitizer.

In one embodiment of the present specification, the photosensitizer included in the adhesive composition provided on one surface of the first protective film may be represented by the following Chemical Formula 3.

[Chemical Formula 3]

In Chemical Formula 3,

X is CRR' or CO,

R and R' are the same as or different from each other, and each independently hydrogen; deuterium; a halogen group; a nitrile group; a nitro group; an amino group; a substituted or unsubstituted alkyl group; a substituted or unsubstituted cycloalkyl group; a substituted or unsubstituted alkenyl group; a substituted or unsubstituted aryl group; a substituted or unsubstituted heteroaryl group; a substituted or unsubstituted arylalkyl group; a substituted or unsubstituted arylalkenyl group; or a substituted or unsubstituted alkylaryl group, Re is hydrogen; deuterium; a halogen group; a nitrile group; a nitro group; an amino group; a substituted or unsubstituted alkyl group; a substituted or unsubstituted cycloalkyl group; a substituted or unsubstituted alkenyl group; a substituted or unsubstituted aryl group; a substituted or unsubstituted heteroaryl group; a substituted or unsubstituted arylalkyl group; a substituted or unsubstituted arylalkenyl group; or a substituted or unsubstituted alkylaryl group, p is an integer of 1 to 8, and when p is 2 or greater, the plurality of Res are the same as or different from each other.

In one embodiment of the present specification, X is CO.

In one embodiment of the present specification, Re is hydrogen; deuterium; or a substituted or unsubstituted alkyl group.

In one embodiment of the present specification, Re is a substituted or unsubstituted linear or branched C1-20 alkyl group.

In one embodiment of the present specification, Re is a substituted or unsubstituted linear or branched C1-6 alkyl group.

According to one embodiment of the present specification, Re is a substituted or unsubstituted ethyl group; or a substituted or unsubstituted isopropyl group.

In one embodiment of the present specification, the photoinitiator included in the adhesive composition provided on one surface of the first protective film and the photoinitiator included in the adhesive composition provided on one surface of the second protective film may be the same as or different from each other.

In one embodiment of the present specification, the photosensitizer included in the adhesive composition provided on one surface of the first protective film and the photosensitizer included in the adhesive composition provided on one surface of the second protective film may be the same as or different from each other.

In one embodiment of the present specification, descriptions on the "adhesive composition" of the present specification may be applied to the adhesive composition provided on the first protective film side.

In one embodiment of the present specification, the adhesive composition provided on the first protective film side and the adhesive composition provided on the second protective film side comprise a photoinitiator and the photosensitizer represented by Chemical Formula 1.

In one embodiment of the present specification, the photoinitiator may be a cation initiator or a radical initiator.

The cation initiator is not particularly limited as long as it is capable of initiating a cation reaction by applying or irradiating light, and for example, a cation photoinitiator initiating a cation reaction by irradiating energy rays may be used.

In one example, an onium salt- or an organometallic salt-based ionized cation initiator or a non-ionized cation photoinitiator such as organosilane- or latent sulfonic acid-based, or other non-ionized compounds may be used as the cation photoinitiator. Examples of the onium salt-based initiator may comprise a diaryliodonium salt, a triarylsulfonium salt, an aryldiazonium salt or the like, examples of the organometallic salt-based initiator may comprise iron arene or the like, examples of the organosilane-based initiator may comprise o-nitrobenzyl triaryl silyl ether, triaryl silyl peroxide, acyl silane or the like, and examples of the latent sulfonic acid-based initiator may comprise alpha-sulfonyloxy ketone, alpha-hydroxymethylbenzoin sulfonate or the like, however, the initiator is not limited thereto. In addition, as the cation initiator, a mixture of an iodine-based initiator and a photosensitizer may also be used.

As the cation initiator, an ionized cation photoinitiator may be used, and for example, an onium salt-based ionized cation photoinitiator may be used, or a triarylsulfonium salt-based ionized cation photoinitiator may be used, however, the cation initiator is not limited thereto.

The adhesive composition may comprise the cation initiator in 0.01 parts by weight to 10 parts by weight, or in 0.1 parts by weight to 5 parts by weight. In the above-described ratio, an adhesive composition having excellent curing efficiency and excellent properties after curing may be provided.

The adhesive composition may further comprise a photoinitiator as a radical initiator capable of initiating a polymerization or crosslinking reaction of an acrylic compound. Examples of the photoinitiator may comprise initiators such as a benzoin-based, a hydroxyketone compound, an aminoketone compound or a phosphine oxide compound, and for example, a phosphine oxide compound or the like may be used. More specific examples of the photoinitiator may comprise benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-methylthio)phenyl]-2-morpholino-propan-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic ester, oligo[2-hydroxy-2-methyl-1-[4-(1-methylvinyl)phenyl]propanone], bis(2,4,6-trimethylbenzoyl)-phenyl-phosphine oxide, 2,4,6-trimethylbenzoyl-diphenyl-phosphine oxide and the like, but are not limited thereto.

In one embodiment of the present specification, the photoinitiator may be included in 0.1 parts by weight to 10 parts by weight, or 0.5 parts by weight to 5 parts by weight based on the total weight of the adhesive composition. When the photoinitiator is included in less than 0.1 parts by weight based on the total weight of the adhesive composition, peel-off failure may occur due to a decrease in the adhesion caused by an insufficient degree of curing, and the content being greater than 10 parts by weight may cause a problem of reducing adhesive strength due to migration of decomposition products of the initiator or the unreacted initiator toward an adhesion interface.

In one embodiment of the present specification, the adhesive composition may comprise any one or more of an epoxy compound and an oxetane compound.

In the present specification, the term "epoxy compound" may mean a monomeric, oligomeric or polymeric compound comprising one or more and preferably two or more epoxy groups.

The epoxy compound may enhance properties such as water resistance, adhesive strength or the like of a protective layer. As the epoxy compound, for example, those that may be crosslinked or polymerized by a cation reaction may be used.

In one example, an epoxy resin having a weight average molecular weight (Mw) of 1,000 to 5,000, and preferably 2,000 to 4,000 may be used as the epoxy compound. In the present specification, the weight average molecular weight means a converted number for standard polystyrene measured using gel permeation chromatography (GPC), and unless particularly defined otherwise, the term "molecular weight" means the "weight average molecular weight". By employing the molecular weight to be 1,000 or greater, durability of the protective layer may be properly maintained, and by employing the molecular weight to be 5,000 or less, workability such as composition coatability may also be effectively maintained In one embodiment of the present specification, the epoxy compound may comprise an alicyclic epoxy compound, an aliphatic epoxy compound or an aromatic epoxy compound.

In the present specification, the alicyclic epoxy compound may be a compound having at least one epoxy group bonding to an alicyclic ring in the molecule as shown in the following Chemical Formula 4.

[Chemical Formula 4]

In Chemical Formula 4, m is an integer of 2 to 5, and a compound in which a group obtained by removing one or a plurality of hydrogen atoms in $(CH_2)m$ from Chemical Formula 4 bonds to another chemical structure having no aromatic ring may be an alicyclic epoxy compound. In other words, it may mean a compound comprising one or more epoxidized aliphatic cyclic groups.

By the epoxy compound comprising an alicyclic epoxy compound, a glass transition temperature of the adhesive composition forming the adhesive layer increases allowing the adhesive layer to secure sufficient durability, and as a result, occurrences of cracks on the polarizer may be prevented even under a heat resistance or heat shock condition.

In the alicyclic epoxy compound comprising the epoxidized aliphatic cyclic group, the epoxidized aliphatic cyclic group may mean, for example, a compound having an epoxy group formed on the alicyclic ring. The hydrogen atom forming the alicyclic ring may be arbitrarily substituted with a substituent such as an alkyl group. Examples of the alicyclic epoxy compound may comprise compounds specifically illustrated below, however, the usable epoxy compound is not limited to the following types.

An example of the alicyclic epoxy compound may comprise an epoxycyclohexylmethyl epoxycyclohexanecarboxylate-based compound represented by the following Chemical Formula 5.

[Chemical Formula 5]

In Chemical Formula 5, $R_1$ and $R_2$ each independently represent hydrogen or an alkyl group.

In the present specification, the term alkyl group may mean, unless particularly defined otherwise, a linear, branched or cyclic alkyl group having 1 to 20 carbon atoms, 1 to 16 carbon atoms, 1 to 12 carbon atoms, 1 to 8 carbon atoms or 1 to carbon atoms, and the alkyl group may be arbitrarily substituted with one or more substituents, or may be unsubstituted.

Another example of the alicyclic epoxy compound may comprise an epoxycyclohexanecarboxylate-based compound of alkanediol represented by the following Chemical Formula 6.

[Chemical Formula 6]

In Chemical Formula 6, $R_3$ and $R_4$ each independently represent hydrogen or an alkyl group, and n represents an integer of 2 to 20.

In addition, another example of the alicyclic epoxy compound may comprise an epoxycyclohexylmethyl ester-based compound of dicarboxylic acid represented by the following Chemical Formula 7.

[Chemical Formula 7]

In Chemical Formula 7, $R_5$ and $R_6$ each independently represent hydrogen or an alkyl group, and p represents an integer of 2 to 20.

Another example of the alicyclic epoxy compound may comprise an epoxycyclohexylmethyl ether-based compound of polyethylene glycol represented by the following Chemical Formula 8.

[Chemical Formula 8]

In Chemical Formula 8, $R_7$ and $R_8$ each independently represent hydrogen or an alkyl group, and q represents an integer of 2 to 20.

Another example of the alicyclic epoxy compound may comprise an epoxycyclohexylmethyl ether-based compound of alkanediol represented by the following Chemical Formula 9.

[Chemical Formula 9]

In Chemical Formula 9, $R_9$ and $R_{10}$ each independently represent hydrogen or an alkyl group, and r represents an integer of 2 to 20.

Another example of the alicyclic epoxy compound may comprise a diepoxytrispiro-based compound represented by the following Chemical Formula 10.

[Chemical Formula 10]

In Chemical Formula 10, $R_{11}$ and $R_{12}$ each independently represent hydrogen or an alkyl group.

Another example of the alicyclic epoxy compound may comprise a diepoxymonospiro-based compound represented by the following Chemical Formula 11.

[Chemical Formula 11]

In Chemical Formula 11, $R_{13}$ and $R_{14}$ each independently represent hydrogen or an alkyl group.

Another example of the alicyclic epoxy compound may comprise a vinylcyclohexene diepoxide compound represented by the following Chemical Formula 12.

[Chemical Formula 12]

In Chemical Formula 12, $R_{15}$ represents hydrogen or an alkyl group.

Another example of the alicyclic epoxy compound may comprise an epoxycyclopentyl ether compound represented by the following Chemical Formula 13.

[Chemical Formula 13]

In Chemical Formula 13, $R_{16}$ and $R_{17}$ each independently represent hydrogen or an alkyl group.

Another example of the alicyclic epoxy compound may comprise a diepoxytricyclodecane compound represented by the following Chemical Formula 14.

[Chemical Formula 14]

In Chemical Formula 14, $R_{18}$ represents hydrogen or an alkyl group.

More specifically, as the alicyclic epoxy compound, an epoxycyclohexylmethyl epoxycyclohexane carboxylate compound, an epoxycyclohexane carboxylate compound of alkandiol, an epoxycyclohexylmethyl ester compound of dicarboxylic acid or an epoxycyclohexylmethyl ether compound of alkanediol is preferably used, and one or more selected from the group consisting of an ester compound of 7-oxabicyclo[4,1,0]heptane-3-carboxylic acid and (7-oxabicyclo[4,1,0]hepto-3-yl)methanol (compound in which $R_1$ and $R_2$ are hydrogen in Chemical Formula 5); an ester compound of 4-methyl-7-oxabicyclo[4,1,0]heptane-3-carboxylic acid and (4-methyl-7-oxa-bicyclo[4,1,0]hepto-3-yl)

methanol (compound in which $R_1$ is 4-$CH_3$ and $R_2$ is 4-$CH_3$ in Chemical Formula 5); an ester compound of 7-oxabicyclo[4,1,0]heptane-3-carboxylic acid and 1,2-ethanediol (compound in which $R_3$ and $R_4$ are hydrogen and n is 1 in Chemical Formula 6); an ester compound of (7-oxabicyclo[4,1,0]hepto-3-yl)methanol and adipic acid (compound in which $R_5$ and $R_6$ are hydrogen and p is 2 in Chemical Formula 7); an ester compound of (4-methyl-7-oxabicyclo[4,1,0]hepto-3-yl)methanol and adipic acid (compound in which $R_5$ and $R_6$ are 4-$CH_3$ and p is 2 in Chemical Formula 7); and an ether compound of (7-oxabicyclo[4,1,0]hepto-3-yl)methanol and 1,2-ethanediol (compound in which $R_9$ and $R_{10}$ are hydrogen and r is 1 in Chemical Formula 9) are preferably used, however, the alicyclic epoxy compound is not limited thereto.

The content of the alicyclic epoxy compound in the epoxy compound may be controlled considering a curing rate. For example, the content of the alicyclic epoxy compound may be 20% by weight or greater, 25% by weight or greater, 30% by weight or greater, 35% by weight or greater, 40% by weight or greater or 45% by weight or greater based on the total epoxy compound weight in the adhesive composition. In one example, the ratio may be 60% by weight or less or 55% by weight or less.

On another base, the weight ratio of the alicyclic epoxy compound in the adhesive composition may be 10% by weight or greater, 12% by weight or greater, 15% by weight or greater or 20% by weight or greater based on the total adhesive composition weight. In one example, the ratio may be 30% by weight or less or 25% by weight or less.

In the present specification, when describing a ratio of each component in the adhesive composition, the ratio is based on a solid content of the adhesive composition. The solid content means an adhesive composition not comprising a solvent component, and means a case in which a solvent ratio in the adhesive composition is 5% by weight or less, 4% by weight or less, 3% by weight or less, 2% by weight or less, 1% by weight or less or 0.5% by weight or less.

In the present specification, a "glycidyl ether-type epoxy compound" may mean a compound comprising at least one or more glycidyl ether groups. In addition, by the epoxy compound comprising the glycidyl ether-type epoxy compound, the glycidyl ether reaction group forms a chain that is soft and has polarity in the protective layer after a curing reaction, and adhesive strength of the protective layer for the polarizer may be enhanced.

Examples of the glycidyl ether-type epoxy compound may comprise aliphatic polyhydric alcohols or an alkylene oxide thereof, for example, polyglycidyl ether of ethylene oxide or propylene oxide adduct. Specific examples of the glycidyl ether-type epoxy compound may comprise novolac epoxy, bisphenol A-based epoxy, bisphenol F-based epoxy, brominated bisphenol epoxy, n-butyl glycidyl ether, aliphatic glycidyl ether (12 to 14 carbon atoms), 2-ethylhexyl glycidyl ether, phenyl glycidyl ether, o-cresyl glycidyl ether, nonylphenyl glycidyl ether, ethylene glycol diglycidyl ether, diethylene glycol diglycidyl ether, propylene glycol diglycidyl ether, tripropylene glycol diglycidyl ether, neopentyl glycol diglycidyl ether, 1,4-butanediol diglycidyl ether, 1,6-hexanediol diglycidyl ether, trimethylolpropane triglycidyl ether, trimethylolpropane diglycidyl ether, trimethylolpropane polyglycidyl ether, polyethylene glycol diglycidyl ether or glycerin triglycidyl ether and the like. In addition, glycidyl ether having a cyclic aliphatic skeleton such as 1,4-cyclohexanedimethanol diglycidyl ether, a hydrogen-added compound of an aromatic epoxy compound or the like may be included as an example, and glycidyl ether having a cyclic aliphatic skeleton, for example, glycidyl ether having a cyclic aliphatic skeleton with, for example, 3 to 20 carbon atoms, 3 to 16 carbon atoms or 3 to 12 carbon atoms may be used, however, the glycidyl ether-type epoxy compound is not limited thereto.

When the epoxy compound comprises both the alicyclic epoxy compound and the glycidyl ether-type epoxy compound, the epoxy compound may comprise the alicyclic epoxy compound in 5 parts by weight to 40 parts by weight and the glycidyl ether-type epoxy compound in 5 parts by weight to 30 parts by weight. In another example, the epoxy compound may comprise the alicyclic epoxy compound in 15 parts by weight to 40 parts by weight and the glycidyl ether-type epoxy compound in 15 parts by weight to 30 parts by weight, or may comprise the alicyclic epoxy compound in 20 parts by weight to 30 parts by weight and the glycidyl ether-type epoxy compound in 20 parts by weight to 30 parts by weight. When the alicyclic epoxy compound is included in 5 parts by weight or greater, durability of the adhesive layer may be sufficiently secured, and when included in 40 parts by weight or less, a problem of decreasing adhesive strength for the PVA polarizer does not occur. The glycidyl ether-type epoxy compound being included in 5 parts by weight or greater is effective in enhancing adhesive strength, and being included in 30 parts by weight or less does not cause a problem of weakening durability of the adhesive layer.

The alicyclic epoxy compound and the glycidyl ether-type epoxy compound may be included in parts by weight of 3:1 to 1:3, and in this range, effects of enhancing durability of the adhesive layer and adhesive strength of the adhesive layer for the PVA polarizer may be maximized.

In addition, the ratio of the epoxy compound in the adhesive composition may be 30% by weight or greater or 35% by weight or greater when employing the total weight of the adhesive composition to be 100% by weight, and the ratio may be 50% by weight or less or 45% by weight or less.

In the present specification, the oxetane compound is a compound having at least one oxetanyl group, and such a compound may be added to control viscosity or to control a curing rate of the adhesive composition.

As the oxetane compound, various types of compounds may be used without particular limit, and examples thereof may comprise 3-ethyl-3-[(3-ethyloxetan-3-yl)methoxymethyl] oxetane, 1,4-bis [(3-ethyloxetan-3-yl)methoxymethyl] benzene, 1,4-bis [(3-ethyloxetan-3-yl)methoxy] benzene, 1,3-bis [(3-ethyloxetan-3-yl)methoxy] benzene, 1,2-bis [(3-ethyloxetan-3-yl)methoxy] benzene, 4,4'-bis [(3-ethyloxetan-3-yl)methoxy] biphenyl, 2,2'-bis [(3-ethyloxetan-3-yl)methoxy] biphenyl, 3,3',5,5'-tetramethyl-4,4'-bis [(3-ethyloxetan-3-yl)methoxy] biphenyl, 2,7-bis [(3-ethyloxetan-3-yl)methoxy] naphthalene, bis [4-{(3-ethyloxetan-3-yl)methoxy}phenyl] methane, bis [2-{(3-ethyloxetan-3-yl)methoxy}phenyl] methane, 2,2-bis [4-{(3-ethyloxetan-3-yl)methoxy}phenyl] propane, an etherified denatured product of a novolac-type phenol-formaldehyde resin by 3-chloromethyl-3-ethyloxetane, 3(4),8(9)-bis [(3-ethyloxetan-3-yl)methoxymethyl]-tricyclo[5.2.1.0 2,6]decane, 2,3-bis [(3-ethyloxetan-3-yl)methoxymethyl] norbornane, 1,1,1-tris [(3-ethyloxetan-3-yl)methoxymethyl] propane, 1-butoxy-2,2-bis [(3-ethyloxetan-3-yl)methoxymethyl] butane, 1,2-bis [{2-(3-ethyloxetan-3-yl)methoxy}ethylthio] ethane, bis [{4-(3-ethyloxetan-3-yl)methylthio}phenyl] sulfide, 1,6-bis [(3-ethyloxetan-3-yl)methoxy]-2,2,3,3,4,4,5,5-octafluorohexane or the like, but are not limited thereto. These oxetane compounds may be readily obtained as commercial products, and specific examples thereof may comprise ARON OXETANE OXT-101 (manufactured by Toagosei Co., Ltd.), ARON OXETANE OXT-121 (manufactured by Toagosei Co., Ltd.), ARON OXETANE OXT-211 (manufactured by Toagosei Co., Ltd.), ARON OXETANE OXT-221 (manufactured by Toagosei Co., Ltd.), ARON OXETANE OXT-212 (manufactured by Toagosei Co., Ltd.) and the like.

Such an oxetane compound may be included in a ratio of 40 parts by weight or greater or 45 parts by weight or greater with respect to 100 parts by weight of the epoxy compound. Under such a ratio, properties such as target viscosity or adhesive strength may be secured while securing a proper curing rate. The ratio of the oxetane compound may be 100 parts by weight or less, 90 parts by weight or less, 80 parts by weight or less or 75 parts by weight or less with respect to 100 parts by weight of the epoxy compound.

In one embodiment of the present specification, the adhesive composition may comprise an acrylic compound, and the compound may be a radical polymerizable compound. The term radical polymerizable compound may mean a compound comprising one or more polymerizable functional groups capable of participating in a free radical polymerization reaction. Examples of the polymerizable functional group may comprise an allyl group, an allyloxy group, an acryloyl group, a methacryloyl group or the like, but are not limited thereto.

As the acrylic compound, a monofunctional acrylic compound having one polymerizable functional group as above, or a multifunctional acrylic compound having two or more polymerizable functional groups as above, for example, 2 to 10, 2 to 9, 2 to 8, 2 to 7, 2 to 6 or 3 to 6 polymerizable functional groups as above may be used, or a mixture of both may be used.

Examples of the monofunctional acrylic compound may comprise methyl (meth)acrylate, ethyl (meth)acrylate, propyl (meth)acrylate, isopropyl (meth)acrylate, butyl (meth)acrylate, isobutyl (meth)acrylate, 2-ethylhexyl (meth)acrylate, octyl (meth)acrylate, isooctyl (meth)acrylate, lauryl (meth)acrylate, stearyl (meth)acrylate, 2-hydroxyethyl (meth)acrylate, 2-hydroxypropyl (meth)acrylate, 4-hydroxybutyl (meth)acrylate, cyclohexyl (meth)acrylate, isobornyl (meth)acrylate, 1,4-cyclohexanedimethylol mono (meth)acrylate, dicyclopentanyl (meth)acrylate, dicyclopentenyl (meth)acrylate, dicyclopentenyloxyethyl (meth)acrylate, benzyl (meth)acrylate, (meth)acrylate of phenol alkylene oxide adduct, (meth)acrylate of p-cumylphenol alkylene oxide adduct, (meth)acrylate of o-phenylphenol alkylene oxide adduct, (meth)acrylate of nonylphenol alkylene oxide adduct, 2-methoxyethyl (meth)acrylate, ethoxyethoxyethyl (meth)acrylate, (meth)acrylate of alkylene oxide adduct of 2-ethylhexyl alcohol, ethylene glycol mono(meth)acrylate, propylene glycol mono(meth)acrylate, pentanediol mono(meth)acrylate, hexanediol mono(meth)acrylate, mono(meth)acrylate of diethylene glycol, mono(meth)acrylate of triethylene glycol, mono(meth)acrylate of tetraethylene glycol, mono(meth)acrylate of polyethylene glycol, mono(meth)acrylate of dipropylene glycol, mono(meth)acrylate of tripropylene glycol, mono(meth) acrylate of polypropylene glycol, 2-hydroxy-3-phenoxypropyl (meth)acrylate, 2-hydroxy-3-butoxypropyl (meth)acrylate, tetrahydrofurfuryl (meth)acrylate, caprolactone-modified tetrahydrofurfuryl (meth)acrylate, 2-ethyl-2-methyl-1,3-dioxolan-4-yl)methyl (meth)acrylate, (2-isobutyl-2-methyl-1,3-dioxolan-4-yl)methyl (meth)acrylate, (1,4-dioxaspiro[4,5]decan-2-yl)methyl (meth)acrylate, glycidyl (meth)acrylate, 3,4-epoxycyclohexylmethyl (meth) acrylate, (3-ethyloxetan-3-yl)methyl (meth)acrylate, 2-(meth)acryloyloxymethyl isocyanate, allyl (meth)acrylate, N-(meth)acryloyloxyethyl hexahydrophthalimide, N-(meth) acryloyloxyethyl tetrahydrophthalimide, 2-(meth)acryloyloxyethyl hexahydrophthalic acid, 2-(meth)acryloyloxyethyl succinic acid, co-carboxy-polycaprolactone mono (meth)acrylate, 2-(meth)acryloyloxyethyl acid phosphate and the like, but are not limited thereto.

When such a monofunctional acrylic compound is included, the monofunctional acrylic compound may be included in a ratio of 50 parts by weight or less, 45 parts by weight or less, 40 parts by weight or less, 35 parts by weight or less, 30 parts by weight or less or 25 parts by weight or less with respect to 100 parts by weight of the epoxy compound. The ratio may be 5 parts by weight or greater or 10 parts by weight or greater with respect to 100 parts by weight of the epoxy compound.

Examples of the multifunctional acrylic compound may comprise an acrylic compound having two polymerizable functional groups such as 1,3-butanediol di(meth)acrylate, 1,6-hexanediol di(meth)acrylate, 1,9-nananediol di(meth)acrylate, 1,10-decanediol di(meth)acrylate, 1,3-butylene glycol di(meth)acrylate, 2-metacryloyloxyethyl acid phosphate, ethylene glycol di(meth)acrylate, diethylene glycol di(meth)acrylate, triethylene glycol di(meth)acrylate, neopentyl glycol di(meth)acrylate, dipropylene glycol di(meth) acrylate, tripropylene glycol di(meth)acrylate, tetraethylene glycol di(meth)acrylate, cyclohexanedimethanol di(meth) acrylate, polyethylene glycol di(meth)acrylate, polyethylene glycol (200) di(meth)acrylate, polyethylene glycol (400) di(meth)acrylate, polyethylene glycol (600) di(meth)acrylate, glycerin di(meth)acrylate, 2-hydroxy-3-acryloyloxypropyl methacrylate or dimethyloltricyclodecane di(meth) acrylate; an acrylic compound having three polymerizable functional groups such as trimethylolpropane tri(meth)acrylate, trimethylolpropane tri(meth)acrylate, trimethylolpropane tri(meth)acrylate, ditrimethylolpropane tri(meth)acrylate, trimethylpropane tri(meth)acrylate, tri(2-hydroxyethyl) isocyanurate triacrylate, tri(2-hydroxyethyl)isocyanurate, pentaerythritol triacrylate, ethoxylate trimethylolpropane tri (meth)acrylate or propoxylate trimethylolpropane tri(meth) acrylate; an acrylic compound having four to five polymerizable functional groups such as pentaerythritol tetra(meth) acrylate, ditrimethylolpropane tetra(meth)acrylate, dipentaerythritol penta(meth)acrylate, epoxylate pentaerythritol tetra(meth)acrylate or pentaacrylate ester; an acrylic compound having six polymerizable functional groups such as dipentaerythritol hexa(meth)acrylate, or the like, but are not limited thereto.

When such a multifunctional acrylic compound is included, the multifunctional acrylic compound may be included in a ratio of 50 parts by weight or less, 45 parts by weight or less, 40 parts by weight or less, 35 parts by weight or less, 30 parts by weight or less or 25 parts by weight or less with respect to 100 parts by weight of the epoxy compound. The ratio may be 5 parts by weight or greater or 10 parts by weight or greater with respect to 100 parts by weight of the epoxy compound.

In one embodiment of the present specification, the adhesive composition may have viscosity of greater than or equal to 50 cPs and less than or equal to 200 cPs at 25° C., and for example, the viscosity may be from 100 cPs to 180 cPs or less at 25° C. When the composition viscosity satisfies the above-mentioned numerical range, the adhesive layer may be formed to be thin, and a curvature on the coating surface may be prevented. The viscosity is measured at 25° C. with a No. 18 spindle using a Brookfield viscometer (manufactured by Brookfield Engineering). Herein, the amount of the composition is suitably from 6.5 mL to 10 mL, and stabilized values are measured within 5 minutes in order to avoid prolonged exposure to light.

The adhesive composition may have a curing time (t1) at which a maximum exothermic peak appears of 100 seconds or shorter when irradiating light at a wavelength of 380 nm to 420 nm and intensity of 100 W/cm$^2$ under an isothermal condition of 25° C. and analyzing a curing behavior using a photo-differential scanning calorimeter (Photo-DSC).

The curing time means a point when curing of the adhesive composition is completed. It may be distinguished such that a curing rate is fast when the curing time is short, and a curing rate is slow when the curing time is long. The curing time means, in a photo-DSC curve represented by a graph having time as an x axis and a heat flow (W/g) as a y axis, a value of the x axis (time) when a maximum value of the curve appears. Herein, the x axis value is defined as the "curing time", and the y axis value is defined as the "maximum exothermic peak".

The curing time may each be 100 seconds or less, 50 seconds or less, and most preferably 45 seconds or less. The curing time being short means a curing rate being fast.

In one embodiment of the present specification, the adhesive composition may further comprise one or more additives selected from the group consisting of a dye, a pigment, an ultraviolet stabilizer, an antioxidant, a colorant, a reinforcing agent, a filler, a defoamer, a surfactant and a plasticizer as necessary.

As the polarizer in one embodiment of the present specification, polarizers well known in the art, for example, films formed with polyvinyl alcohol (PVA) comprising iodine or a dichroic dye may be used. The polarizer may be prepared by dyeing a polyvinyl alcohol film with iodine or a dichroic dye, however, the preparation method is not particularly limited.

In the present specification, the polarizer means a state not comprising a protective layer (or protective film), and the polarizing plate means a state comprising a polarizer and a protective layer (or protective film).

In one embodiment of the present specification, the polarizer may have a thickness of greater than or equal to 5 μm and less than or equal to 40 μm, and more preferably greater than or equal to 5 μm and less than or equal to 25 μm. When the polarizer thickness is smaller than the above-mentioned range, optical properties may decline, and when the thickness is larger than the above-mentioned range, the degree of polarizer shrinkage at a low temperature (approximately −30° C.) increases causing a problem in overall heat resistance of the polarizing plate.

In one embodiment of the present specification, when the polarizer is a polyvinyl alcohol-based film, the polyvinyl alcohol-based film may be used without particularly limit as long as it comprises a polyvinyl alcohol resin or a derivative thereof. Herein, the derivative of the polyvinyl alcohol resin may comprise, but is not limited to, a polyvinyl formal resin, a polyvinyl acetal resin and the like. Alternatively, as the polyvinyl alcohol-based film, commercially available polyvinyl alcohol-based films generally used for polarizer preparation in the art such as P30, PE30 or PE60 of Kuraray Co. Ltd., and M2000, M3000 or M6000 of Nippon Gohsei Co., Ltd. may also be used.

In one embodiment of the present specification, the polyvinyl alcohol-based film preferably has, although not limited thereto, a degree of polymerization of greater than or equal to 1,000 and less than or equal to 10,000, and preferably greater than or equal to 1,500 and less than or equal to 5,000. This is due to the fact that, when the degree of polymerization satisfies the above-mentioned range, molecular movements are free, and mixing with iodine, a dichroic dye or the like is smooth.

In one embodiment of the present specification, the preparing of a polarizer may use a commercially available polarizer, or the polarizer may be prepared and used.

In one embodiment of the present specification, the method of providing the adhesive composition in the providing of an adhesive composition on one surface of the first protective film and the second protective film is not particularly limited, and for example, the active energy ray-curable composition may be coated on one surface of the polarizer using a coating method well known in the art such as spin coating, bar coating, roll coating, gravure coating or blade coating.

In one embodiment of the present specification, the adhesive composition provided in the providing of an adhesive composition on one surface of the first protective film and the second protective film has a thickness of 0.1 μm to 30 μm, preferably 0.1 μm to 10 μm, and more preferably 0.1 μm to 5 μm.

In one embodiment of the present specification, in the bonding of the first protective film on one surface of the polarizer and the laminating of the second protective film on the other surface of the polarizer, a method of the bonding is not particularly limited, and for example, may be bonding each constitution of the laminate of the first protective film/the polarizer/the second protective film using a pressing means.

In one embodiment of the present specification, in the adhering of the first protective film, the polarizer and the second protective film by curing the adhesive composition through irradiating active energy rays on the first protective film side, each constitution of the polarizing plate adheres to each other while the adhesive composition is cured. Herein, the curing rate or qualities of the adhesive layer after curing may be enhanced by controlling a curing condition and the like of the adhesive composition.

In one embodiment of the present specification, the curing of the adhesive composition by irradiating the active energy rays may be conducted using a method of irradiating light using an active energy ray irradiating device.

The active energy ray irradiating device is not particularly limited, and examples thereof may comprise a fusion lamp, an arc lamp, an LED and a low pressure lamp.

In one embodiment of the present specification, the active energy rays may have a wavelength range of 200 nm to 500 nm or 320 nm to 500 nm, preferably 320 nm to 420 nm, and more preferably 365 nm to 400 nm. Satisfying the above-mentioned numerical range may prevent curl occurrences in the polarizing plate, and has an advantage of smooth curing by having excellent reactivity of the photosensitizer represented by Chemical Formula 1 having favorable reactivity in a long wavelength region.

The active energy rays may have light intensity of 100 mJ/cm$^2$ to 1,000 mJ/cm$^2$, and preferably 500 mJ/cm$^2$ to 1,000 mJ/cm$^2$, and irradiation time of the irradiated light may be from 1 second to 10 minutes, and preferably from 2 seconds to 30 seconds.

When satisfying the light intensity and the irradiation time ranges of the active energy rays, the curing rate of the adhesive layer is high, and excessive transfer of heat from a light source is prevented without declining appearance properties and optical properties of the film, and it minimizes the occurrences of running wrinkles on the polarizer leading to an advantage of superior productivity.

One embodiment of the present specification provides an adhesive composition for a polarizing plate, the composition comprising a photoinitiator and the photosensitizer represented by Chemical Formula 1. The adhesive composition for a polarizing plate is used for forming a polarizing plate adhesive layer. Descriptions on Chemical Formula 1 and the photosensitizer are the same as the descriptions provided above.

Hereinafter, the present specification will be described in more detail with reference to examples. However, the following examples are for illustrative purposes only, and the scope of the present specification is not limited thereby.

Example and Comparative Example

Preparation Example

30 Parts by weight of 3,4-epoxycyclohexylmethyl-3',4'-epoxycyclohexane carboxylate (manufactured by Daicel Corporation, product name CEL 2021P), 22 parts by weight of bisphenol F epoxy resin (manufactured by Kukdo Chemical Co., Ltd.), 5 parts by weight of 3-3'(oxybis(methylene)) bis(3-ethyloxetane) (manufactured by Toagosei Co. Ltd., product name OXT-221), 5 parts by weight of 3-ethyl-3-hydromethyl-oxetane (manufactured by Toagosei Co. Ltd., product name OXT101), 30 parts by weight of ethylhexyl oxetane (manufactured by Toagosei Co. Ltd., product name OXT212), and 8 parts by weight of dipropylene glycol diacrylate (manufactured by HanNong Chemical Co., Ltd.) were mixed to prepare an adhesive composition.

With respect to 100 parts by weight of the adhesive composition, a photosensitizer and a photoinitiator were mixed in a content of each material of the following Table 1.

Example and Comparative Example

Comparative Example 1

An elongated polarizer having a thickness of 17 μm (light transmittance 39% at wavelength of 400 nm) was prepared (Manufacturer: Nippon Gohsei Co., Ltd.), and the adhesive composition of Composition A1 was coated on one surface of each of a first protective film (material: TAC, light transmittance 81% at wavelength of 400 nm) and a second protective film (TAC, 25% at wavelength of 400 nm).

After that, the first protective film was laminated on one surface of the polarizer, the second protective film was laminated on the other surface of the polarizer, and by curing the adhesive composition through irradiating active energy rays (wavelength range of 320 nm to 500 nm, illumination intensity of 540 mJ/cm$^2$ or greater) on the first protective film side using a V-bulb lamp, the first protective film, the polarizer and the second protective film were adhered to manufacture a polarizing plate.

Herein, the time taken to cure the adhesive composition on the second protective film side was measured using method and criteria of the following Experimental Example 1, and the results are shown in the following Table 2.

The method of irradiating light on the first protective film side is illustrated in FIG. 1.

Comparative Examples 2 to 4 and Examples 1 to 5

Polarizing plates were manufactured in the same manner as in Comparative Example 1 except that Compositions A2 to A5 and B1 to B5 were each used instead of Composition A1, and using the following method and criteria, the time taken to cure the adhesive composition on the second

TABLE 1

| | Photosensitizer | | Photoinitiator | |
|---|---|---|---|---|
| | A | B | C | D |
| Composition A1 | 0.7 | — | 3.3 | — |
| Composition A2 | 1.2 | — | 3.3 | — |
| Composition A3 | 0.7 | — | — | 3.3 |
| Composition A4 | 1.2 | — | — | 3.3 |
| Composition A5 | — | 0.7 | 3.3 | — |
| Composition B1 | — | 1.2 | 3.3 | — |
| Composition B2 | — | 0.7 | — | 2.3 |
| Composition B3 | — | 0.7 | — | 3.3 |
| Composition B4 | — | 0.7 | — | 4.3 |
| Composition B5 | — | 1.2 | — | 3.3 |

A: 2-Isopropylthioxanthone,
B: 2,4-Diethylthioxanthone,
C: [4-Methylphenyl-(4-(2-methylpropyl)phenyl)]iodonium hexafluorophosphate,
D: [(Phenylthio)phenyl] diphenylsulfonium hexafluorophosphate, protective film side (that is, the adhesive composition provided between the polarizer and the second protective film) was measured, and the results are shown in the following Table 2.

Experimental Example 1: Qualitative Analysis of Curing Time

The composition curing time shown below was obtained by measuring time from the point when active energy rays were irradiated to the point when a sticking property disappeared while peeling off the second protective film of the polarizing plate from the polarizer by hand. Herein, disappearance of the sticking property was evaluated such that the composition was evaluated to be not cured when the adhesive was peeled off while forming a film when the adhesive layer part was rubbed by hand while peeling off the second protective film and the polarizer, and the composition was evaluated to be cured when a film was not formed and the adhesive was not peeled off.

Experimental Example 2: Quantitative Analysis of Curing Time

Figure 2:
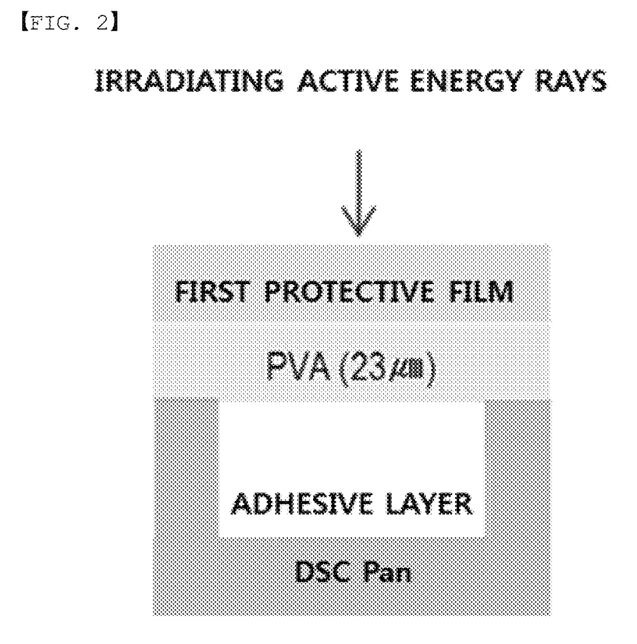
FIG. 2 illustrates a method of DSC analysis for quantitatively analyzing a curing time of Experimental Example 2.

A sample for an experiment as in FIG. 2 was prepared to perform a DSC analysis. The sample for an experiment was designed such that active energy rays transmitting the first protective film (material: TAC, light transmittance 81% at wavelength of 400 nm) and the PVA polarizer (23 μm) reaches an adhesive placed inside the DSC PAN. The adhesive placed inside the DSC PAN corresponds to the adhesive composition used on the second protective film side.

The time taken to cure the composition inside the DSC PAN was measured using the sample for an experiment. Specifically, when conducting the DSC analysis (PHOTO DSC, DSC Q-200 device used, light irradiated at approximately 20% level and intensity of 100 mW) under an exposure condition of 390 nm wavelength and 100 W/cm$^2$ intensity under an isothermal condition of 25° C., the time when a maximum exothermic peak (P) appeared was employed as a curing time (t1), and the peak area (J/g) herein was calculated.

In the examples, it was identified that the adhesive layer on the second protective film side was sufficiently cured. On the other hand, in the comparative examples, it was identified that the adhesive layer on the second protective film side was not cured. In the examples, curing was obtained since the adhesive layer of the protective film (second protective film) provided on a surface opposite to the side where light was directly irradiated had excellent sensitivity to light in a long wavelength band, however, in the comparative examples, it was identified that curing was not obtained since the adhesive layer of the protective film (second protective film) provided on a surface opposite to the side where light was directly irradiated had decreased sensitivity to light in a long wavelength band.

In other words, the adhesive composition used in the examples used a photosensitizer having excellent sensitivity to a long wavelength of 365 nm or greater, and therefore, the adhesive layer provided on a surface opposite to the side where light was directly irradiated was readily cured even in a long wavelength band region.

The invention claimed is:

1. A method for manufacturing a polarizing plate, the method comprising:

preparing a polarizer;

providing an adhesive composition on one surface of each of a first protective film and a second protective film;

laminating the first protective film on one surface of the polarizer, and laminating the second protective film on the other surface of the polarizer; and adhering the first protective film, the polarizer and the second protective film by curing the adhesive composition through irradiating active energy rays on the first protective film side, wherein the adhesive composition provided on one surface of the second protective film comprises a photoinitiator and a photosensitizer represented by the following Chemical Formula 2:

TABLE 2

|  |  | Comparative Example 1 | Comparative Example 2 | Comparative Example 3 | Comparative Example 4 | Comparative Example 5 |
|---|---|---|---|---|---|---|
| Adhesive Composition | Type | Composition A1 | Composition A2 | Composition A3 | Composition A4 | Composition A5 |
| Experimental Example 1 | Qualitative Analysis | Not Cured | Not Cured | Not Cured | Not Cured | Not Cured |
| Experimental Example 2 | Curing Rate [s] | 49.8 s | 46.2 s | Not Measured | Not Measured | Not Measured |
|  | Heat of Reaction [J/g] | 349.1 | 254.9 | Not Measured | Not Measured | Not Measured |
|  |  | Example 1 | Example 2 | Example 3 | Example 4 | Example 5 |
| Adhesive Composition | Type | Composition B1 | Composition B2 | Composition B3 | Composition B4 | Composition B5 |
| Experimental Example 1 | Qualitative Analysis | 180 Seconds | 175 Seconds | 150 Seconds | 140 Seconds | 100 Seconds |
| Experimental Example 2 | Curing Rate [s] | 44.4 s | Not Measured | Not Measured | Not Measured | Not Measured |
|  | Heat of Reaction [J/g] | 260.8 | Not Measured | Not Measured | Not Measured | Not Measured |

[Chemical Formula 2]

in Chemical Formula 2,

Ra and Rb are the same as or different from each other, and are hydrogen; deuterium; or a substituted or unsubstituted alkyl group;

Rc is a substituted or unsubstituted alkyl group;

m is an integer of 0 to 4; n is an integer of 0 to 2;

when m is 2 or greater, Ra the same as or different from each other;

when n is 2, Rb are the same as or different from each other;

the active energy rays have a maximum wavelength range of 380 nm to 420 nm;

light transmittance of the first protective film for the active energy rays is higher than light transmittance of the second protective film for the active energy rays.

2. The method for manufacturing a polarizing plate of claim 1, wherein the first protective film has light transmission of 70% or greater at a wavelength of 400 nm.

3. The method for manufacturing a polarizing plate of claim 1, wherein the first protective film or the second protective film is a triacetyl cellulose-based film.

4. The method for manufacturing a polarizing plate of claim 1, wherein the second protective film is a retardation film.

5. The method for manufacturing a polarizing plate of claim 1, wherein the second protective film and the first protective film have a thickness ratio of 1:3 to 3:1.

6. The method for manufacturing a polarizing plate of claim 1, wherein the adhering of the first protective film, the polarizer and the second protective film further comprises irradiating active energy rays on the second protective film side after irradiating active energy rays on the first protective film side.

7. The method for manufacturing a polarizing plate of claim 1, wherein the photosensitizer has a main absorption wavelength band of 360 nm to 420 nm.

8. The method for manufacturing a polarizing plate of claim 1, wherein a content of the photosensitizer is 5% by weight or less based on a total weight of the adhesive composition.

9. The method for manufacturing a polarizing plate of claim 1, wherein the adhesive composition comprises the photosensitizer and the photoinitiator in a content ratio of 1:1 to 1:10.

10. The method for manufacturing a polarizing plate of claim 1, wherein the adhesive composition comprises any one or more of an epoxy compound and an oxetane compound.

11. The method for manufacturing a polarizing plate of claim 1, wherein the adhesive composition has viscosity of greater than or equal to 50 cps and less than or equal to 200 cps at 25° C.

12. The method for manufacturing a polarizing plate of claim 1, wherein the adhesive composition has a curing time (t1) at which a maximum exothermic peak appears of 100 seconds or shorter when irradiating light at a wavelength of 380 nm to 420 nm and intensity of 100 W/cm$^2$ under an isothermal condition of 25° C. and analyzing a curing behavior using a photo-differential scanning calorimeter (Photo-DSC).

* * * * *